(12) United States Patent
Hera et al.

(10) Patent No.: US 11,600,287 B2
(45) Date of Patent: Mar. 7, 2023

(54) CANCELLATION OF VEHICLE ACTIVE SOUND MANAGEMENT SIGNALS FOR HANDSFREE SYSTEMS

(71) Applicant: Bose Corporation, Framingham, MA (US)

(72) Inventors: Cristian Marius Hera, Lancaster, MA (US); Samuel Sangmin Rhee, Northborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/367,683

(22) Filed: Mar. 28, 2019

(65) Prior Publication Data

US 2020/0312344 A1 Oct. 1, 2020

(51) Int. Cl.
| | | |
|---|---|---|
| G10L 21/0232 | (2013.01) |
| G10L 15/22 | (2006.01) |
| H04R 1/40 | (2006.01) |
| G10L 15/20 | (2006.01) |
| H04R 3/00 | (2006.01) |
| G10L 21/0208 | (2013.01) |

(52) U.S. Cl.
CPC .......... *G10L 21/0232* (2013.01); *G10L 15/20* (2013.01); *G10L 15/22* (2013.01); *H04R 1/406* (2013.01); *H04R 3/005* (2013.01); *G10L 2021/02082* (2013.01); *H04R 2499/13* (2013.01)

(58) Field of Classification Search
CPC ... G10L 13/00; G10L 15/26; G10L 2015/228; G10L 2021/02166; G10L 21/0272; G10L 25/51; G10L 15/04; G10L 15/22; G10L 15/30; G10L 2015/223; H03G 3/342; H04J 3/0685; H04L 49/206; H04L 49/40; H04L 49/552; H04M 2201/40; H04M 2201/60; H04M 2203/2061; H04M 3/42153; H04R 1/403; H04R 1/406; H04R 2201/401; H04R 2201/405; H04R 2430/23; H04R 3/00; H04R 3/005; H04R 3/12; H04R 5/04; H04S 2400/15; H04S 2420/13; H04S 7/303
USPC ................ 381/66, 71.1–71.6, 94.1–94.4, 86; 379/410, 406, 411, 406.5–406.8; 348/14.01–14.5; 700/94
See application file for complete search history.

(56) References Cited

U.S. PATENT DOCUMENTS

| | | | | |
|---|---|---|---|---|
| 6,246,760 | B1 * | 6/2001 | Makino | H04M 9/082 379/406.08 |
| 6,873,708 | B1 * | 3/2005 | Levy | H04R 3/00 381/98 |
| 7,039,197 | B1 * | 5/2006 | Venkatesh | H04R 3/005 381/86 |
| 7,925,007 | B2 * | 4/2011 | Stokes, III | H04M 9/082 379/406.08 |

(Continued)

*Primary Examiner* — Lun-See Lao
(74) *Attorney, Agent, or Firm* — Bose Corporation

(57) ABSTRACT

Audio systems and methods are provided that receive a sound management input signal as a reference signal to remove related content from a microphone signal in, e.g., an automotive hands-free system. The sound management signal may provide an acoustic augmentation to reduce, enhance, or create an acoustic effect, e.g., of an engine, motor, or other operating components. A signal processor receives the sound management signal and the microphone signal, and reduces or removes the sound management signal components from the microphone signal.

9 Claims, 3 Drawing Sheets

(56) References Cited

U.S. PATENT DOCUMENTS

| | | | | |
|---|---|---|---|---|
| 8,244,538 B2* | 8/2012 | Paranjpe | ............... | G10L 15/26 |
| | | | | 704/270 |
| 8,848,937 B2* | 9/2014 | Inoue | ................. | G10K 11/16 |
| | | | | 381/71.1 |
| 9,508,359 B2* | 11/2016 | Gao | ................... | G10L 21/0208 |
| 2018/0025430 A1* | 1/2018 | Perl | ................... | B60R 16/0231 |
| | | | | 705/4 |

* cited by examiner

CANCELLATION OF VEHICLE ACTIVE SOUND MANAGEMENT SIGNALS FOR HANDSFREE SYSTEMS

TECHNICAL FIELD

Aspects and examples of the present disclosure are directed generally to voice and audio systems and methods, and in some examples, more specifically to systems and methods for removing noise and acoustic echo signals from microphone signals.

BACKGROUND

Audio systems, especially automobile audio systems, are used to produce acoustic signals for various purposes such as entertainment (e.g., music, talk radio, sports), navigation (e.g., route guidance), and communication (e.g., telephone calls). Some such audio systems also produce sounds for noise cancellation (e.g., engine harmonic cancellation and/or road noise cancellation) and/or produce sounds intended to enhance the occupants' experience of the vehicle (e.g., engine harmonic enhancement, augmented sounds for continuously variable transmissions (CVT) and/or electric vehicles (EV)).

Various audio systems may incorporate one or more microphones intended to pick up a user's voice for certain applications, such as the near end of a telephone call or for commands to a virtual personal assistant and/or automation features. The various signals produced by the audio system may contribute to the microphone signal(s), and thus it is desirable to remove these signal components from the microphone signal(s) to process the user's voice signal.

SUMMARY

Aspects and examples are directed to audio systems and methods that use echo cancelers and/or residual echo suppressors (e.g., postfilters), to reduce echo content in an audio signal, generally provided by one or more microphones. The audio systems and methods use various signals from other components of the audio system, and especially from various sound management components such as sound enhancement and/or noise cancellation systems, as reference signals for one or more echo cancelation filters.

According to one aspect, an audio system is provided that includes a sound management input configured to be coupled to a sound management system that provides a sound management signal, the sound management signal representative of an acoustic augmentation that, when applied to a listening environment, reduces, enhances, or creates an acoustic effect of a machinery operating in proximity to the listening environment, a signal processor coupled to the sound management input and configured to receive the sound management signal and provide at least one driver signal based at least in part upon the sound management signal, an acoustic transducer coupled to the signal processor and configured to receive the at least one driver signal and to convert the at least one driver signal into acoustic signals in the listening environment, a microphone input configured to receive a microphone signal from the listening environment, the microphone signal including an echo component related to the acoustic signal produced by the acoustic transducer, and an echo canceler coupled to the sound management input and the microphone input to receive the sound management signal and the microphone signal, the echo canceler configured to reduce the echo component from the microphone signal.

In some examples, the echo canceler includes an adaptive filter configured to filter the sound management signal and to provide an estimated echo signal, and a combiner configured to combine the microphone signal and the estimated echo signal to reduce the echo component from the microphone signal.

Certain examples include the sound management system, the sound management system configured to receive signals representative of an operating state of the machinery and to provide the sound management signal based upon the operating state of the machinery. Various examples include an automobile, the listening environment being an interior of the automobile and the machinery being a component of the automobile. The component of the automobile may be an automobile engine, an automobile motor, a driver control input, an environmental control equipment, a transmission, an axle, and/or a wheel, in various examples.

Various examples include an audio program input configured to receive a program content signal, the signal processor being further configured to provide the driver signal based upon the sound management signal and the program content signal, and the echo canceler being further configured to reduce second echo components from the microphone signal, the second echo components being related to the program content signal.

Further examples may include a combiner coupled to the microphone input and a plurality of microphones coupled to the combiner, each of the plurality of microphones providing an individual microphone signal to combiner and the combiner configured to combine the plurality of individual microphone signals to provide the microphone signal to the microphone input. In some examples, the combiner may be an array processor configured to apply array processing to the plurality of individual microphone signals to provide an enhanced acoustic response of the microphone signal in a direction of a user position in the listening environment.

According to another aspect, a method of providing a voice audio signal from a user in an acoustic environment is provided. The method includes receiving a sound management signal from a sound management system, the sound management signal representative of an acoustic augmentation that, when applied to the acoustic environment, reduces, enhances, or creates an acoustic effect of a machinery operating in proximity to the acoustic environment, processing the sound management signal to provide a driver signal, converting the driver signal, by an acoustic transducer, into an acoustic signal in the acoustic environment, receiving a microphone signal representative of the acoustic environment, including the user's voice audio signal and including an echo component related to the acoustic signal, filtering the sound management signal to provide an estimated echo signal, combining the estimated echo signal with the microphone signal to reduce the echo component from the microphone signal to provide an estimated voice signal, and providing the estimated voice signal to a voice processing system.

In some examples, filtering the sound management signal comprises filtering the sound management signal by an adaptive filter.

Various examples include providing the sound management signal, by the sound management system. Certain examples may include receiving, by the sound management system, signals representative of an operating state of the machinery and generating the sound management signal, by the sound management system, based upon the operating state of the machinery. In some examples, the signals representative of an operating state of the machinery may be signals representative of an operating state of at least one of an automobile engine, an automobile motor, a driver control input, an environmental control equipment, a transmission, an axle, and/or a wheel.

Certain examples also include receiving a program content signal, and wherein processing the sound management signal to provide a driver signal comprises processing the sound management signal and the program content signal to provide the driver signal, and filtering the sound management signal to provide an estimated echo signal comprises filtering the sound management signal and the program content signal to provide the estimated echo signal.

Various examples may include array processing a plurality of individual microphone signals to generate the microphone signal and providing the microphone signal.

According to another aspect, an audio system is provided that includes audio program processing configured to receive an audio program content signal and to provide a driver signal based upon the audio program content signal, sound management processing configured to receive operating state information of a machinery and to generate one or more audio signals that, when transduced into acoustic signals, reduce, enhance, or create an acoustic effect of the machinery in an acoustic environment, an acoustic transducer coupled to the audio program processing and the sound management processing and configured to receive the driver signal and the audio signals and to transduce the driver signal and the audio signals into acoustic signals in the acoustic environment, a plurality of microphones proximate to the acoustic environment, each of the plurality of microphones configured to provide a microphone signal representative of the acoustic environment, a combiner configured to receive the plurality of microphone signals and to combine the plurality of microphone signals to provide a combined microphone signal, the combined microphone signal including components representative of the audio program content signal, the one or more audio signals, and a voice signal of a user in the acoustic environment when the user is speaking, and an echo canceler configured to receive the audio program content signal, the one or more audio signals, and the microphone signal, and to reduce from the microphone signal the components representative of the audio program content signal and the one or more audio signals, to provide an estimate of the voice signal.

In some examples, the echo canceler comprises an adaptive filter configured to adaptively filter at least one of the audio program content signal and the one or more audio signals and to provide an estimated echo signal, and a second combiner configured to combine the microphone signal and the estimated echo signal to provide the estimate of the voice signal.

Certain examples include an automobile, the acoustic environment being an interior of the automobile and the machinery being a component of the automobile. The component of the automobile may be an automobile engine, an automobile motor, a driver control input, an environmental control equipment, a transmission, an axle, and/or a wheel, in various examples. Some examples may include a sensor coupled to the component of the automobile and configured to provide the operating state information.

Still other aspects, examples, and advantages are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Figure 1:
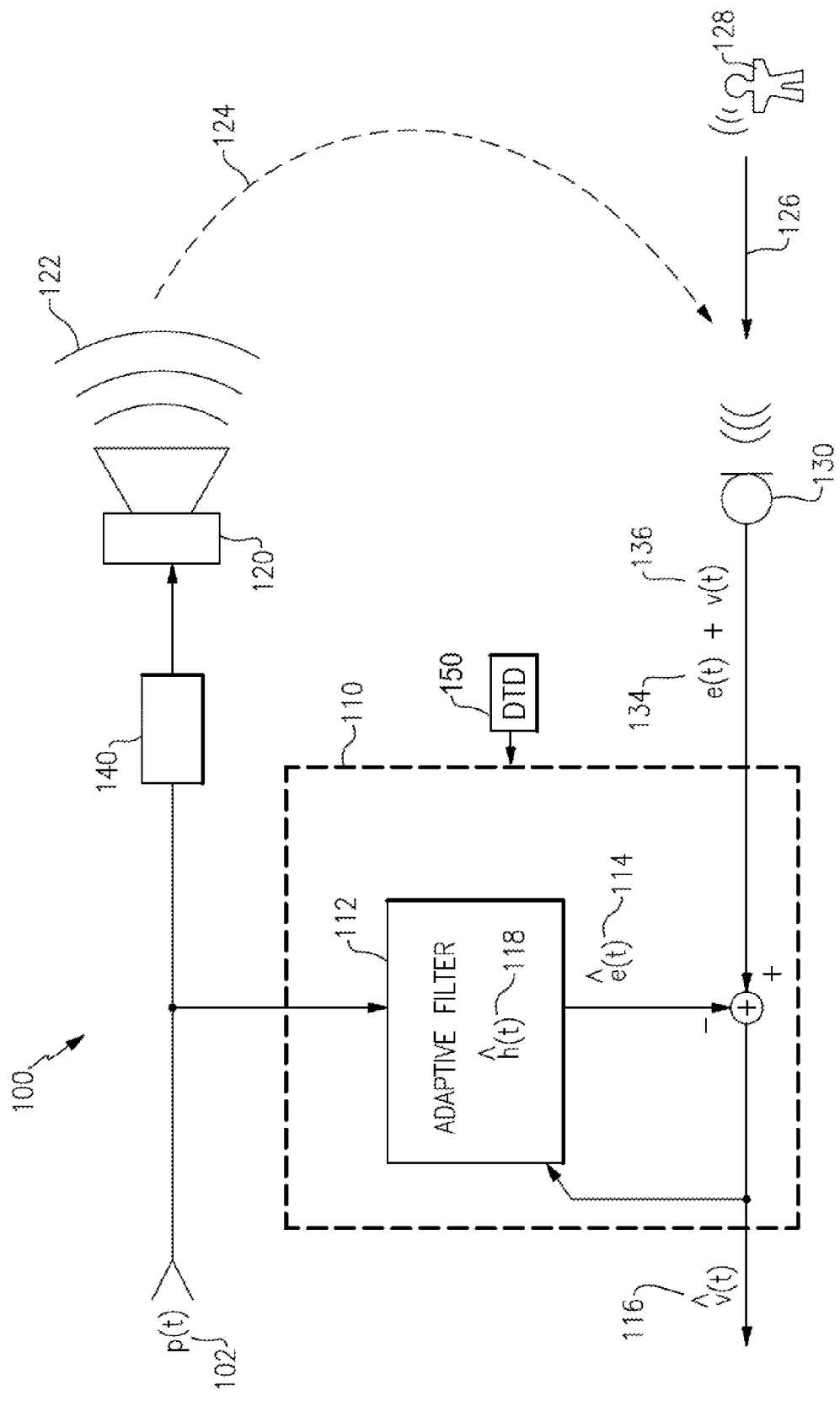
FIG. 1 is a schematic diagram of an example audio system including echo cancelation.

Aspects of the present disclosure are directed to audio systems and methods that provide echo cancelation associated with one or more microphones intended to pick up a user's voice. Such a microphone will sense the user's voice when speaking and will also include audio signals produced by the audio system (playback signals, navigation prompts, noise cancellation signals, engine and/or transmission acoustic enhancement signals, etc.) as well as other undesired signals (e.g., noise, non-speech, etc.). Aspects and examples disclosed herein reduce or remove these unwanted signal components using multi-channel echo cancelation having various signal sources as reference signals for the echo cancelation function.

Audio systems, especially automotive audio systems, may produce acoustic signals in an environment, e.g., a vehicle compartment, for the benefit of people in the environment. The acoustic signals may be for entertainment, information, communication, navigation, noise cancellation, acoustic enhancement (augmented engine harmonics, CVT sounds, EV sounds, etc.) for example.

Such audio systems may also accept acoustic input from the occupants, e.g., one or more people may verbally speak and their voices may be picked up by the audio system, e.g., via one or more microphones, for various purposes such as telephone conversations, verbal commands to a navigation system or a virtual personal assistant, and the like. When the audio system renders an acoustic signal, e.g., via an acoustic transducer such as a loudspeaker, the microphone(s) may also pick up the rendered acoustic signal in addition to the user's voice. For example, the user may be having a phone conversation and listening to the radio at the same time, and the microphone will pick up both the user's voice and the radio program. A portion of the microphone signal may therefore be due to the audio system's own acoustic production, and that portion of the microphone signal is deemed an echo signal. In such cases, an acoustic echo canceler may be used to reduce or remove the echo signal portion from the microphone signal. When multiple loudspeakers and/or multiple audio signal sources are used, there may be multiple acoustic echo cancelers involved.

In addition, various echo cancelation subsystems may include residual echo suppression filters, or postfilters, typically implemented as spectral subtraction filters, that may use the same or similar reference signals as the echo cancelation filters. Accordingly, all examples disclosed herein are intended to include echo cancelation subsystems that provide the same or similar reference signals to such a postfilter (for reduction of residual echo), as are provided to the various described echo cancelation filters.

The audio system may provide various signal processing, such as equalization and sound stage programming, to prepare an audio signal to be converted into an acoustic signal by, e.g., a loudspeaker, and acoustic echo cancelers may use various adaptive algorithms to estimate the echo created by the audio system processing, the loudspeaker, and the environment in which the system operates. Multiple loudspeakers, multiple audio signal sources, additional audio signal sources for sound enhancement and/or noise cancelation, and multiple signal processing options (e.g., equalization, sound stage) conventionally require a number of acoustic echo cancelers, each of which works to estimate the echo of a particular channel combination of audio source and sound-stage options.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 illustrates an example audio system 100 that includes an echo canceler 110, one or more acoustic drivers 120, and one or more microphones 130. The audio system 100 receives a program content signal 102, p(t), that is converted into an acoustic program signal 122 by the one or more acoustic drivers 120. The acoustic drivers 120 may have further processing component(s) 140 associated with them, such as may provide array processing, amplification, equalization, mixing, etc. Additionally, the program content signal 102 may include multiple tracks, such as a stereo left and right pair, or multiple program content signals to be mixed or processed in various ways. The program content signal 102 may be an analog or digital signal and may be provided as a compressed and/or packetized stream, and additional information may be received as part of such a stream, such as instructions, commands, or parameters from another system for control and/or configuration of the processing component(s) 140, the echo canceler 110, or other components.

The block diagrams illustrated in the figures, such as the example audio system 100 of FIG. 1, are schematic representations and not necessarily illustrative of individual hardware elements. For instance, in some examples, each of the echo canceler(s) 110, the processing component(s) 140, and other components and/or any portions or combinations of these, may be implemented in one set of circuitry, such as a digital signal processor, a controller, or other logic circuitry, and may include instructions for the circuitry to perform the functions described herein.

A microphone, such as the microphone 130, may receive each of an acoustic echo signal 124, an acoustic voice signal 126 from a user 128, and other acoustic signals such as background noise and/or road noise. The microphone 130 converts acoustic signals into, e.g., electrical signals, and provides them to the echo canceler 110. Specifically, when a user 128 is speaking, the microphone 130 provides a voice signal 136, v(t), and an echo signal 134, e(t), as part of a combined signal to the echo canceler 110. The echo canceler 110 functions to attempt to remove the echo signal 134 from the combined signal to provide an estimated voice signal 116, v̂(t). The echo canceler 110 works to remove the echo signal 134 by processing the program content signal 102 through a filter 112 to produce an estimated echo signal 114, ê(t), which is subtracted from the signal provided by the microphone 130.

For example, the acoustic program signal 122 causes the echo signal 134. If the filter 112 performs well at providing an estimated echo signal 114, it will perform well at removing the echo signal 134 from the signal provided by the microphone 130. As a result, the estimated voice signal 116, v̂(t), may be a good representation of the actual voice signal 136, v(t).

The echo canceler 110 may include an adaptive algorithm to update the filter 112, at intervals, to improve the estimated echo signal 114. Over time, the adaptive algorithm causes the filter 112 to converge on satisfactory parameters that produce a sufficiently accurate estimated echo signal 114. Generally, the adaptive algorithm updates the filter during times when the user 128 is not speaking, thus some examples may include a double talk detector 150 configured to detect when the user 128 is speaking and thus freeze or suspend adaptation, but in some examples the adaptive algorithm may make updates at any time.

The filter 112 may apply a set of filter coefficients to the program content signal 102 to produce the estimated echo signal 114, ê(t). The adaptive algorithm may use any of various techniques to determine the filter coefficients and to update, or change, the filter coefficients to improve performance of the filter 112. In some examples, the adaptive algorithm may operate on a background filter, separate from the filter 112, to seek out a set of filter coefficients that performs better than an active set of coefficients being used in the filter 112. When a better set of coefficients is identified, they may be copied to the filter 112 in active operation.

Such adaptive algorithms, whether operating on an active filter or a background filter, may include, for example, a least mean squares (LMS) algorithm, a normalized least mean squares (NLMS) algorithm, a recursive least square (RLS) algorithm, or any combination or variation of these or other algorithms. The filter 112, as adapted by the adaptive algorithm, converges to apply an estimated transfer function 118, $\hat{h}(t)$, which is representative of the overall response of the processing 140, the acoustic driver(s) 120, the acoustic environment, and the microphone(s) 130, to the program content signal 102. The transfer function is a representation of how the program content signal 102 is transformed from its received form into the echo signal 134.

Figure 2:
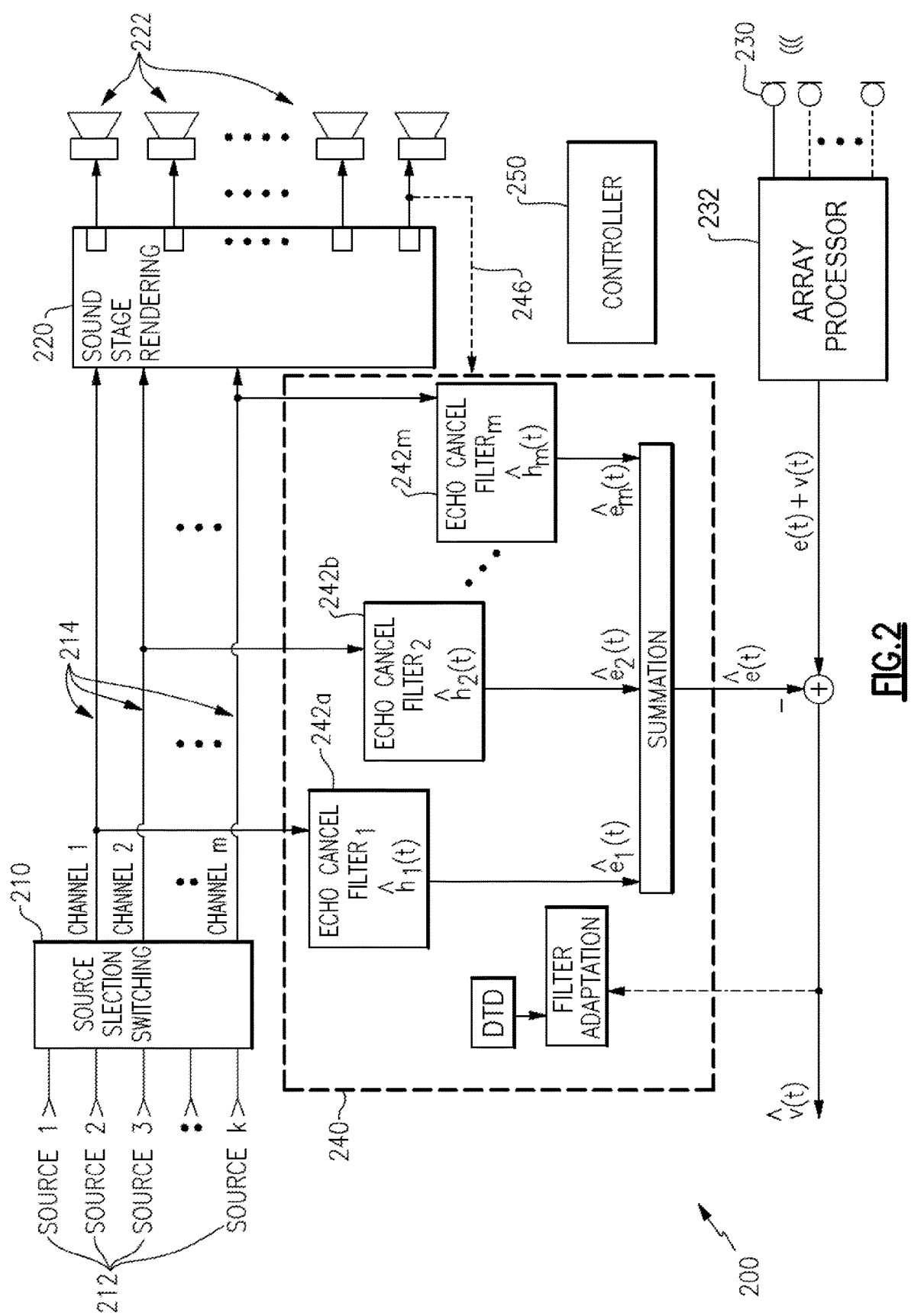
FIG. 2 is a schematic diagram of an example audio system including multi-channel echo cancelation.

FIG. 2 illustrates an example multi-channel audio system 200 that includes source selection switching 210 to allow selection from among multiple sources 212 to provide one or more program content signals for rendering as acoustic signals. The audio system 200 also includes a sound stage processor 220 to control a number of acoustic transducers 222, at least one microphone input and/or at least one microphone 230 to pick up acoustic signals in the environment, including user voices and audio system echoes, an echo cancelation subsystem 240 for estimating the echo signal content of the audio signal provided by the microphone 230, and a controller 250 to manage one or more components of the source selection switching 210, the sound stage processor 220, and/or the echo cancelation subsystem 240.

In some examples, the echo cancelation subsystem 240 may operate on signals or signal channels after processing by the sound stage processor 220, rather than prior to sound stage processing as shown in the figures. For example, the echo cancelation subsystem 240 may operate on signals provided directly to the acoustic transducers 222, before or after amplification, as optionally illustrated by signal path 246 (and in FIG. 3 as optional signal path 346). In other examples, there may be various signal processing before, after, or both before and after the provision of such signals to the echo cancelation subsystem 240.

In some examples, the microphone 230 may be an array of microphones, as shown, having array processing 232 to steer beams toward sources of desired acoustic signals and/or away from undesired acoustic sources, and may additionally or alternately steer nulls toward undesired sources. In such examples, the controller 250 may further control such array processing components, or such array processing components may be alternately controlled and/or may be pre-configured for various operating characteristics. In other examples, the microphone 230 may be a microphone input or other signal input suitable to receive an audio signal from a microphone, whether pre-processed, filtered, combined, etc.

Any of the sources 212 may include hardware for providing an audio signal, such as a radio tuner, navigation system, telephone system, and the like, or may include inputs to accept audio signals from an external device. For example, any of the sources 212 may include one or more physical electrical connections or wireless connections, or any combination of wired and wireless connections, and may include network interfaces to receive (and optionally to provide) various audio signals. Various of these or other interfaces may also include inputs to receive commands and control parameters, such as filter settings, equalization, volume control, or other sound stage parameters, etc.

The echo cancelation subsystem includes a number of echo cancelation filters 242, each of which may be associated with a particular content channel 214. The content channels 214 provide content signals to the sound stage processor 220, from among the sources 212 (as selected by the source selection switching under the control of the controller 250). The sound stage processor 220 provides various processing, such as equalization and loudspeaker routing, to drive the acoustic transducers 222 to generate acoustic sound fields in accordance with the various program content signals and sound stage parameters.

The various sources 212 may provide audio content to be rendered within the environment, such as an interior compartment of a vehicle, and may include numerous types of audio sources, such as radios, telephones, navigation systems, etc. Each of the sources 212 and each sub-channel provided by the sources 212 may have differing requirements for sound stage rendering, such as equalization settings and routing to various acoustic transducers 222 or groups of acoustics transducers 222. Any of the sources 212 may have numerous sub-channels, such as left and right, front and rear, center, sub, or the like, and any of the sources 212 may have differing sub-channels based upon a mode of operation, such as a radio receiver may operate in different modes to receive audio content in a mono, stereo, or multi-channel surround format. Further, certain program content may be provided to be rendered in the rear of the vehicle while providing different program content to be rendered in the front of the vehicle.

For example, a telephone conversation may be selected to provide program content to be rendered acoustically near a passenger, and a navigation device may be selected to provide program content to be rendered acoustically near a driver. At any time, a warning system (e.g., lane drift, blind-spot detection, etc.) may provide content to be rendered at various locations.

Figure 3:
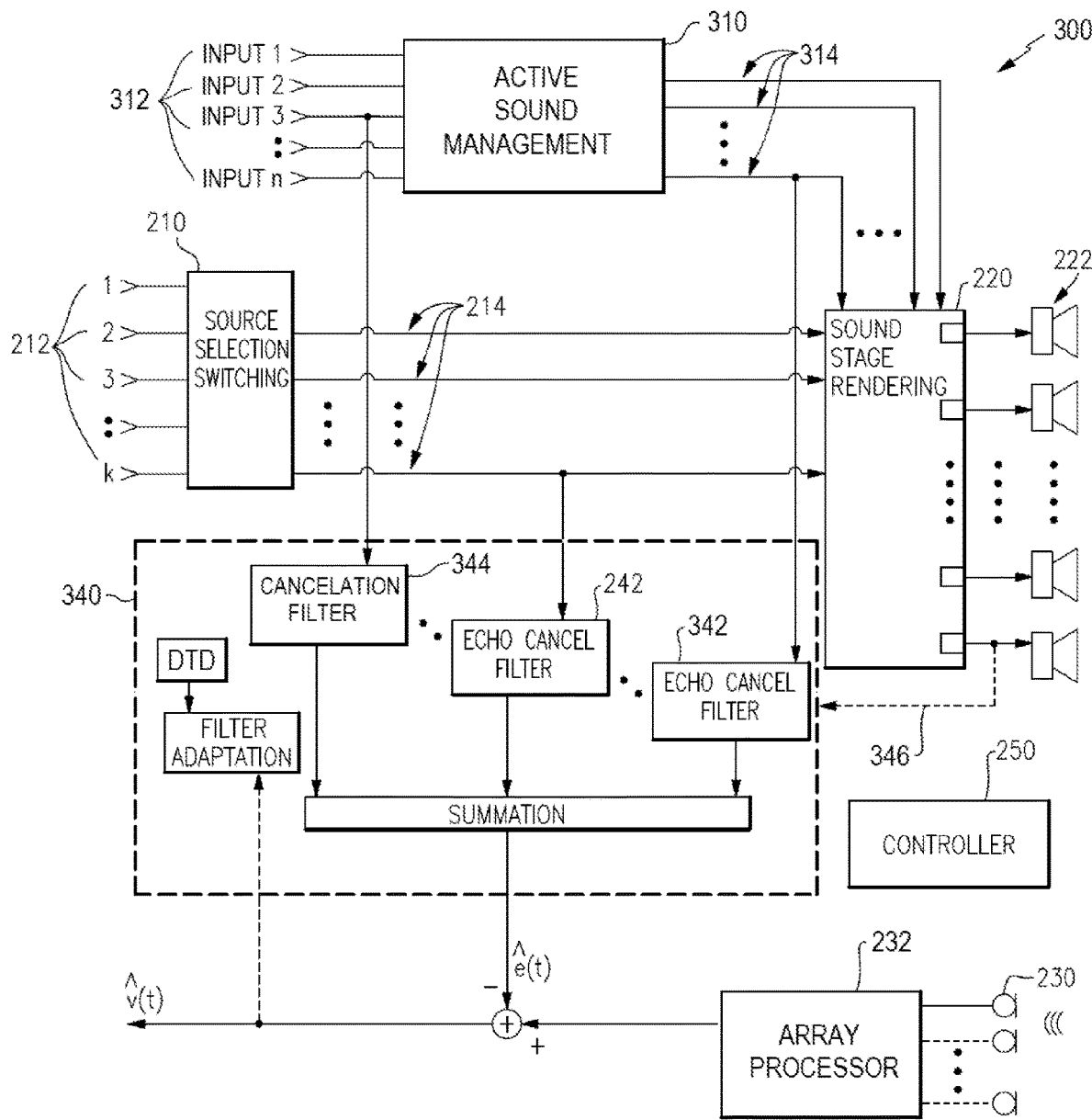
FIG. 3 is a schematic diagram of an example audio system including additional sound management with multi-channel echo cancelation.

FIG. 3 illustrates a further example multi-channel audio system 300. The audio system 300 is similar to the audio system 200 but includes one or more additional sound source(s), such as an active sound management system 310, that may provide one or more output audio signal(s) 314 to be rendered by the acoustic transducers 222. Examples of the active sound management system 310 may include various noise cancelation (or reduction) systems, such as road noise cancelation, engine and/or transmission harmonic cancelation, and/or other cancelation systems, and may include various sound enhancement systems, such as engine and/or transmission sound enhancement systems (e.g., harmonic and/or custom enhancement) that may generate sound to enhance the interior acoustic signature of an engine and power train, a continuously variable transmission, an electric vehicle, or the like, and/or to mimic or mask various acoustic properties to create differing acoustic experiences that may be related to the operation of the vehicle.

Any such active sound management system 310 may contribute additional signal components picked up by the one or more microphone(s) 230. The audio system 300 includes an echo cancelation subsystem 340 that differs from the echo cancelation subsystem 240 of FIG. 2, in that the echo cancelation subsystem 340 may include one or more echo cancelation filters 342 configured to receive an output audio signal 314 from the active sound management system 310 as a reference signal for generating an estimated echo component related to the audio output of the active sound management system 310.

In various examples, the echo cancelation subsystem 340 may also include, or may alternatively include, one or more cancelation filters 344 configured to receive any of various input signal(s) 312 to the active sound management system 310. Accordingly, one or more of the input signal(s) 312 may serve as a reference signal to generate an estimated echo signal. For instance, the active sound management system 310 may generate the output audio signals 314 based on the one or more input signals 312, such that the an input signal 312 may serve as a reference signal for generating an estimated echo signal to reduce or cancel an acoustic effect of the output audio signal(s) 314 reaching the microphone(s) 230.

In some examples, the active sound management system 310 may generate output audio signals 314 to reduce, enhance, and/or create various sounds from a vehicle's powertrain, such as from an engine, motor, transmission, transaxle, etc. In some examples, reduced or enhanced sounds may be related to engine harmonics, and such systems may generally be referred to as engine harmonic cancelation (EHC) and/or engine harmonic enhancement (EHE) systems. Such may also refer to systems that enhance or reduce vehicle sounds not related to harmonics, or that create new sounds, such as a sound generator to create sound effects such as backfire, afterfire, crackle sound effects, and the like. Further, an active sound management system 310 may create an acoustic environment intended to make one thing sound like another, such as to make an electric vehicle sound like a gasoline vehicle, or to make a continuously variable transmission sound like gear shifting, or the like, or to make an entirely new machinery sound, for instance.

Any of various such systems may receive any number of input signals 312. Example input signals 312 for EHE/EHC systems may include an indication of rotations per minute (RPM), torque, load, temperature, or the like of any of the vehicle rotating equipment (such as engine, transmission, wheels, etc.), or other operating condition of any of the vehicle equipment, which may produce undesired cabin acoustics (e.g., cooling fan on/off condition and speed, interior fan condition and speed, etc.) to be canceled, or that may be the basis for producing enhancement sounds (e.g., position of an accelerator pedal or control, position of a brake pedal or control, steering wheel position, gear and/or gear changes, or other operator control inputs).

In various examples, the cancelation filter 344 may be configured to pre-process such signals, e.g., an RPM value may be converted to a harmonic sinusoid, for example, which may then be subsequently filtered, including by adaptive filtering as described in more detail above.

In various examples, one or more of the filters 242, 342, 344 may be configured as a fixed filter, such as may be a pre-determined filter, that may further be pre-determined by acoustic measurements or other empirical means, and thereby may not be an adaptive filter. Also as described above, various examples may include a double talk detector that may indicate when a user is speaking and may cause any filter adaptation(s) to freeze, pause, suspend, etc.

In some examples, an audio system may include a plurality of acoustic drivers and/or a plurality of microphones, and may include various processing, which may include array processing, to process signals to the acoustic drivers and/or to process signals from the microphones, or a sub-set of either the acoustic drivers or microphones, as appropriate for various applications and/or changing operational requirements.

It should be understood that many, if not all, of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), microcontroller(s), and the like, or any combination of these, may be suitable, and may include analog or digital circuit components and/or other components with respect to any particular implementation. Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, driver, or loudspeaker, may be any of many types of transducers known in the art. For example, an acoustic structure coupled to a magnetic coil positioned in a magnetic field, to cause motion in response to electrical signals received by the coil, may be a suitable acoustic transducer. Additionally, a piezoelectric material may respond to electrical signals by expanding or contracting in one or more dimensions and may be a suitable acoustic transducer. In various examples, acoustic transducers may take other forms.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. An audio system, comprising:
   a sound management system that receives information about a rotation rate of at least one of an engine, a motor, a transmission, an axle, or a wheel and provides a sound management signal configured to enhance or to reduce at least one harmonic of the engine, motor, transmission, axle, or wheel;
   a signal processor coupled to the sound management system and configured to receive the sound management signal and provide at least one driver signal based at least in part upon the sound management signal;
   an acoustic transducer coupled to the signal processor and configured to receive the at least one driver signal and to convert the at least one driver signal into acoustic signals in a listening environment;
   a microphone positioned in the listening environment to provide a microphone signal from the listening environment, the microphone signal including an echo component related to the acoustic signal produced by the acoustic transducer; and
   a cancelation filter coupled to the sound management system and the microphone, the cancelation filter configured to receive the information about the rotation rate and the microphone signal, the cancelation filter further configured to reduce from the microphone signal, based upon the information about the rotation rate, at least a portion of the echo component related to the sound management signal.

2. The audio system of claim 1 wherein the cancelation filter comprises an adaptive filter configured to filter the information about the rotation rate and to provide an estimated echo signal, and a combiner configured to combine the microphone signal and the estimated echo signal to reduce the echo component from the microphone signal.

3. The audio system of claim 1 further comprising an automobile, the listening environment being an interior of the automobile and the engine, motor, transmission, axle, or wheel being a component of the automobile.

4. The audio system of claim 1 further comprising an audio program system configured to provide a program content signal, the signal processor being further configured to provide the driver signal based upon the sound management signal and the program content signal, and an echo canceler configured to reduce second echo components from the microphone signal, the second echo components being related to the program content signal.

5. The audio system of claim 1 wherein the microphone comprises a plurality of microphones and the microphone signal being a combination of microphone signals from the plurality of microphones.

6. The audio system of claim 5 further comprising an array processor configured to apply array processing to the plurality of individual microphone signals to provide an enhanced acoustic response of the microphone signal in a direction of a user position in the listening environment.

7. A method of providing a voice audio signal from a user in an acoustic environment, the method comprising:

receiving a sound management signal from a sound management system, the sound management system receiving information about a rotation rate of at least one of an engine, a motor, a transmission, an axle, or a wheel and providing the sound management signal configured to enhance or to reduce at least one harmonic of the engine, motor, transmission, axle, or wheel in the acoustic environment;

processing the sound management signal to provide a driver signal;

converting the driver signal, by an acoustic transducer, into an acoustic signal in the acoustic environment;

receiving a microphone signal representative of the acoustic environment, including the user's voice audio signal and including an echo component related to the acoustic signal;

filtering the information about the rotation rate to provide an estimated echo signal, the estimated echo signal thereby being related to the sound management signal;

combining the estimated echo signal with the microphone signal to reduce the echo component from the microphone signal to provide an estimated voice signal; and providing the estimated voice signal to a voice processing system.

8. The method of claim 7 wherein filtering the information about the rotation rate comprises filtering the sound management signal by an adaptive filter.

9. The method of claim 7 further comprising array processing a plurality of individual microphone signals to generate the microphone signal and providing the microphone signal.

* * * * *